United States Patent [19]

van der Lely

[11] 4,283,905
[45] Aug. 18, 1981

[54] MOWING MACHINE

[76] Inventor: Cornelis van der Lely, 7, Brüschenrain, Zug, Switzerland

[21] Appl. No.: 878,913

[22] Filed: Feb. 17, 1978

[30] Foreign Application Priority Data

Feb. 17, 1977 [NL] Netherlands .................. 7701668

[51] Int. Cl.³ .......................................... A01D 55/18
[52] U.S. Cl. ................................. 56/295; 56/13.6; 56/6
[58] Field of Search .................. 56/295, 192, 13.6, 6

[56] References Cited

U.S. PATENT DOCUMENTS

| 3,040,502 | 6/1962 | Smith et al. | 56/6 |
| 3,070,938 | 1/1963 | Winget | 56/6 |
| 3,391,522 | 7/1968 | Zweegers | 56/6 |
| 3,513,648 | 5/1970 | Kline et al. | 56/13.6 |
| 3,857,225 | 12/1954 | Knudson | 56/13.6 |

FOREIGN PATENT DOCUMENTS

| 1813610 | 7/1969 | Fed. Rep. of Germany | 56/295 |
| 1507290 | 1/1970 | Fed. Rep. of Germany | 56/192 |
| 1582338 | 7/1970 | Fed. Rep. of Germany | 56/192 |
| 1936054 | 1/1971 | Fed. Rep. of Germany | 56/192 |

Primary Examiner—Robert A. Hafer
Attorney, Agent, or Firm—Penrose Lucas Albright

[57] ABSTRACT

A mowing machine for connection to the three-point hitch of a tractor which extends laterally of the tractor. A drive of meshing pinions contained in a housing, the drive being powered via belts from the power take-off of the tractor. The drive rotates the cutting members about vertical axes which are supported by and disposed immediately above a plate-like supporting element. Plate-like connecting members connect the cutting members with the drive pinions, such connecting members rotating with the cutting members about the same axis. Adjacent cutting members rotate in opposite directions and adjacent connecting members co-operate to move cut crop to the rear relative the mowing machine in swaths by contact and air movement generated thereby. The drive pinions and the cutting members have roller bearings to minimize vibration. The cutting members have an annular member including a horizontally extending disc with two cutter blades connected thereto by readily removable pins, the pins being held in place by springs and protected on the upperside of the disc by screening plates. The supporting element has openings for removing the pins. It also has threaded openings for receiving housings for the cutting members' bearings. It is straight on the rear and crenated on the forward edge whereby the cutter blades rotate parallel to and extending forward of the crenated edge of the supporting element. Supporting members which are each rounded on their bottom may be secured to the underside of the supporting element under each cutting member. Optionally, the connecting members may be tubular instead of plate-like.

13 Claims, 7 Drawing Figures

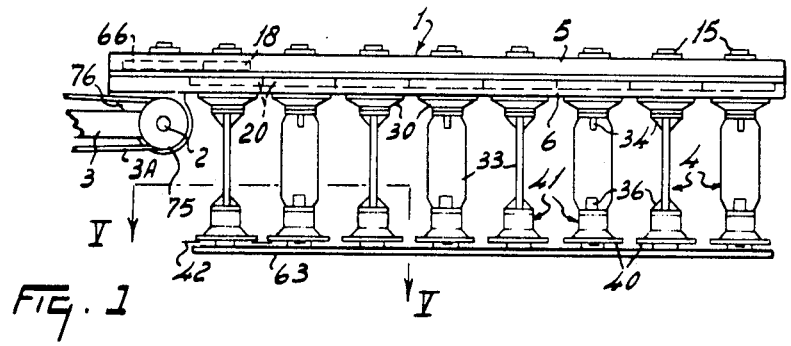
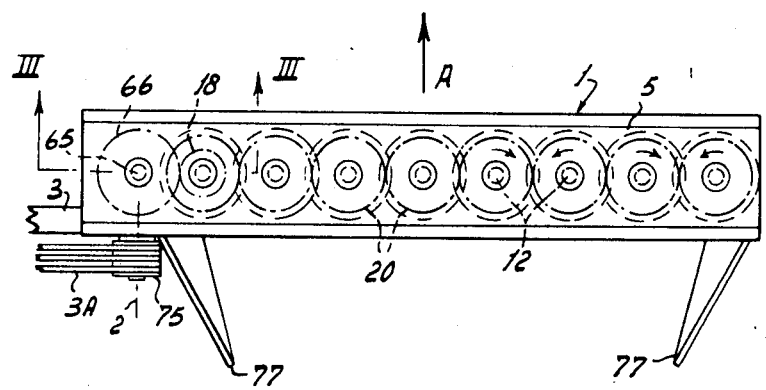
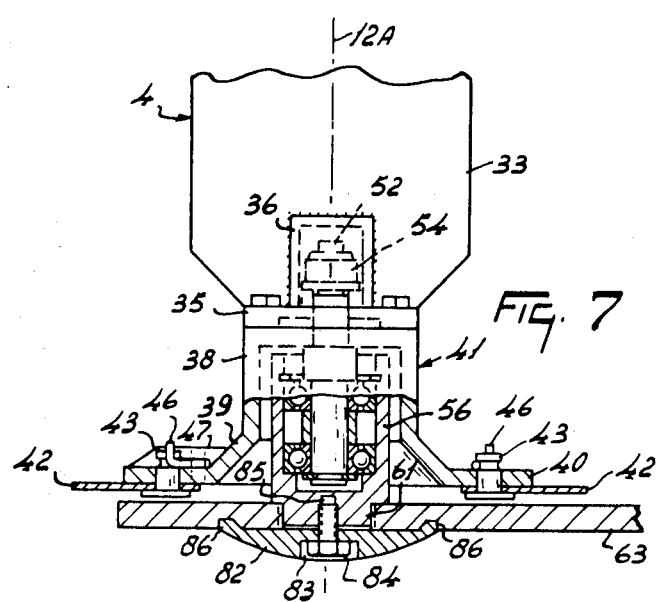

MOWING MACHINE

SUMMARY OF THE INVENTION

This invention relates to a mowing machine.

According to a first aspect of the present invention there is provided a mowing machine comprising at least two cutting members which are mounted for rotation about upwardly extending axes, the distance between the axes of adjacent cutting members being not greater than thirty centimeters.

According to a second aspect of the present invention there is provided a mowing machine comprising at least two cutting members which are mounted for rotation about upwardly extending axes and are rotatable by drive means disposed above the cutting members, each cutting member being provided at its lower region with a cutter supporting means connecting member being arranged between the drive means and such cutter supporting means, this connecting member having, in horizontal section, a larger dimension in a first direction than in a second direction.

According to a third aspect of the present invention there is provided a mowing machine comprising at least two cutting members which depend from a horizontal beam and are mounted for rotation about upwardly extending axes and are rotatable by drive means disposed above the cutting members, each cutting member having at its lower end a cutter supporting means which is provided with a cutter, the cutting members being supported at their lower ends by a supporting element, each cutter being disposed between the cutter supporting means and the supporting element, the cutting members being the sole connection between the horizontal beam and the supporting element.

According to a fourth aspect of the present invention there is provided a mowing machine comprising at least two cutting members which are mounted for rotation about upwardly extending axes and are rotatable by drive means disposed above the cutting members, each cutting member being supported at its lower region by a supporting element which is provided with a bearing housing accommodating at least two bearings for supporting the cutting member.

According to a fifth aspect of the present invention there is provided a mowing machine comprising at least two cutting members which are mounted for rotation about upwardly extending axes and are rotatable by drive means disposed above the cutting members, the drive means being such that the cutting members can be driven with a speed of 4000 rev/min or more.

For a better understanding of the present invention and to show how it may be carried into effect, reference will now be made, by way of example only, to the accompanying drawings, in which:

BRIEF DESCRIPTION OF THE DRAWINGS

FIG. 1 is a horizontal elevational view of a mowing machine;

FIG. 2 is a plan view of the mowing machine shown in FIG. 1;

FIG. 7 shows a further embodiment of part of the mowing machine.

DESCRIPTION OF THE PREFERRED EMBODIMENTS

The mowing machine shown in FIGS. 1 and 2 comprises a supporting beam 1 extending transversely of the intended direction of operative travel. The supporting beam 1 has on its lower side near one of its ends a horizontal pivotal shaft 2 extending substantially in the direction of travel, and the supporting beam 1 is pivotable about this pivotal shaft 2 with respect to an intermediate frame 3. The rear side of the supporting beam has a plurality of V-belts 3A spaced from one another in the direction of travel A and driven from the power take-off shaft of a tractor (not shown). The mounting of the mowing machine on the tractor and the method of driving it from the tractor are substantially similar to the construction disclosed in U.S. Pat. No. 2,974,630.

Figure 3:
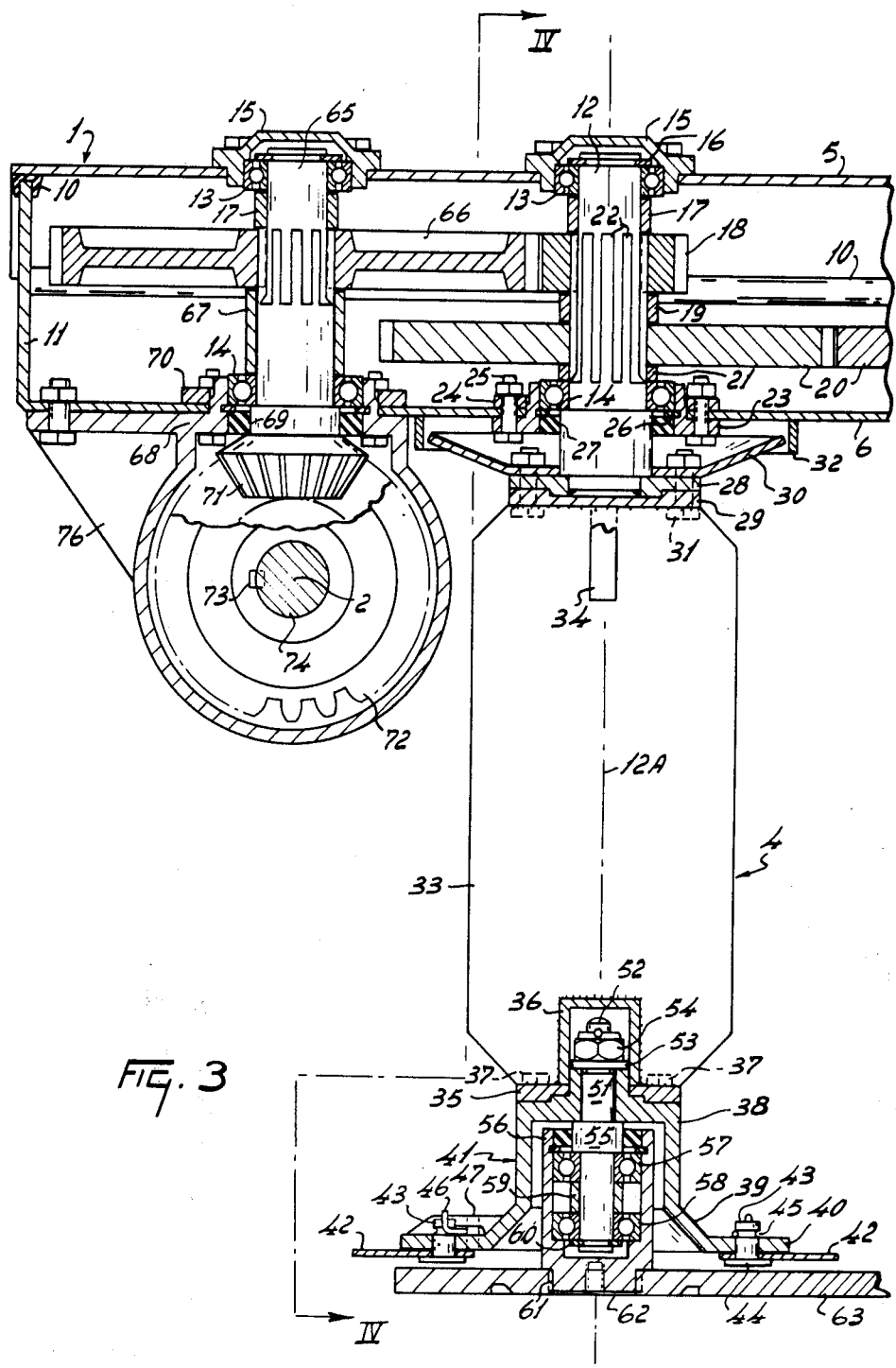
FIG. 3 is an enlarged sectional view taken on the lines III—III in FIG. 2.

The supporting beam 1 constitutes a gear casing for a driving gear assembly comprising a plurality of spur gears. At least one, and, in the illustrated embodiment, eight, cutting members 4 are journalled in the supporting beam 1. The supporting beam 1 comprises an upper part 5 and a lower part 6 which are interconnected along the length of the beam 1 by bolts 9 which extend through rim or edge portions 7 and 8. For sealing purposes, a packing 10 is provided between the rims 7 and 8 (see FIG. 4). At the ends of the supporting beam 1 the lower part 6 extends upwardly as an end wall 11 to near the top wall of the upper part 5 (FIG. 3). Each cutting member 4 is rotatably supported in the supporting beam 1 by means of a shaft 12 having a rotary axis 12A. The shaft 12 is held in ball bearings 13 and 14 in the upper part 5 and in the lower part 6 respectively. The bearing 13 is covered by a bearing cap 15. The bearing 13 slidably receives shaft 12 and is prevented from moving upwards by a circlip 16. Beneath the bearing 13 shaft 12 mounts a pinion 18 with a spacer sleeve 17 therebetween. Beneath pinion 18 is another spacer sleeve 19 which surrounds the shaft and below which is mounted another pinion 20. Between pinion 20 and the bearing 14 there is a sleeve 21 which separates the bearing and the pinion at a distance from one another. In order to allow the pinions 18 and 20 to move axially, the shaft 12 has splines 22. The bearing 14 is fitted in a bearing housing 23, which is secured to the lower part 6 by a clamping ring 24 and bolts 25. The bearing housing 23 is provided on its inner periphery with a circlip 26 thereby preventing the bearing 15 from moving downwards. Beneath the circlip 26 is an annular packing 27 which seals the space between the bearing housing 23 and the lower part of the shaft 12. To the lower end portion of the shaft 12 is welded a flange 28, which is coaxial with the axis 12A. The flange 28 is welded to a slightly smaller diameter portion of the shaft 12. The flange 28 serves as a means for fastening the remaining portion of the cutting assembly 4 to the shaft 12. To the flange 28 is releasably fastened a flange 29 and a covering hood 30 by four bolts 31. The hood 30 extends radially outwardly from the flange 28 and is upwardly inclined. The covering hood 30 lies generally in a conical plane, the apex of which is directed downwards and is located on the rotary axis 12A where flanges 28 and 29 meet. The lower side of the lower part 6 is provided with an annular collar 32 which is secured thereto by clips or the like (not shown) or any other appropriate means within the skill of the art, and which closely surrounds the covering hood 30 and prevents crop from winding around the shaft 12. The flange 29 has a rectangular horizontal cross-section and is connected at its bottom side with a connecting member comprising a plate 33 which is located symmetrically to the rotary axis 12A. As shown in the elevation of FIG. 3, the fastening portion of the plate 33 is slightly narrowed and near the fastening portion are two triangular brackets 34 that ensure a sufficiently stiff connection between the top of the cutting member 4 and the driving gear assembly above it. The triangular brackets 34 are preferably substantially normal to the plate 33. At a given distance below flange 29 the plate 33 has its largest horizontal dimension, which is preferably at least ten times the smallest dimension. This largest dimension is preferably fourteen times the smallest dimension and preferably amounts to fourteen centimeters. Near its lower end the plate 33 tapers inwardly and downwardly towards the rotary axis 12A. To the lower end of plate 33 is welded a flange 35 having a rectangular shape, viewed on plan, and on either side of the plate 33 are arranged two brackets 36. As can be seen in the elevational view of FIG. 4, each bracket 36 is substantially triangular and as can be seen in the sectional view of FIG. 3, each bracket 36 is hollow. Like the brackets 34, the brackets 36 lie parallel to a plane perpendicular to the plate 33. By means of four bolts 37 near its corners, the flange 35 is releasably fastened to the top of a hub 38. The hub 38 is substantially cylindrical and its top portion, near the rotary axis 12A, projects through the flange 35. Near its bottom portion, the hub 38 has an inclined portion 39 extending outwardly from the hub 38 and inclined downwardly, its surface being parallel to a conical plane having its apex located on the rotary axis 12A beneath the flange 35. The portion 39 is integral with an annular collar 40 extending transversely of the rotary axis 12A. The hub 38, the portion 39 and the annular collar 40 together constitute a cutter support means 41, to which two cutters 42 are disposed diametrically opposite one another on the bottom side of the annular collar 40 (FIG. 3). Each cutter 42 is freely pivotable through an angle of less than 360° and preferably through about 180°, about a pin 43 which extends through an opening in the collar 40 and is provided with a shoulder 44 serving as a lower support for the cutter 42. Above the annular collar 40 the pin 43 has an annular groove 45. The pin 43 can be fixed in place vertically by a spring 46. The portion of the spring 46 remote from the pin is located inside a pocket defined by a guide plate 47 (FIG. 5), which forms an elevated part on the top surface of the annular collar 40 with which it is integral or otherwise affixed and is located, viewed in the direction of rotation B or C of the respective cutting element, in front of the pin 43 for protective purposes. The spring 46 has some turns surrounding an upstanding pin or peg 48, which acts as a pivotal axis for the end portion of the spring 46 engaging the pin 43. Peg 48 is releasably arranged in an opening in the annular collar 40. The turns around peg 48 give the spring 46 such a tension that is exerted by the end portion in the groove 45 radial outward pressure. At the front, with respect to the direction of rotation B or C of the cutting element, the guide plate 47 has a downwardly inclined portion 49. The plate 47 has an approximately similar downwardly inclined portion 50 near the outer periphery of the annular collar 40 (FIG. 5).

Hub 38 has an axial opening through which a solid shaft 51 extends. Shaft 51 has a stub end 52 which is located, as seen in the elevational view of FIG. 3, inside the brackets 36 in a recess in the plate 33. The stub end 52 has a washer 53 and a nut 54 locked by a pin on the stub end 52. 51 is provided within the hub 38 with a widened collar 55, the top of which abuts the top portion of the hub 38, most of this collar being disposed within a bearing housing 56 having a substantially cylindrical outer periphery. The nut 54 and the collar 55 firmly secure the shaft portion to the hub 38. Inside the bearing housing 56 are two ball bearings 57 and 58 which surround the lower part of the shaft 51 and which are held apart by a spacer sleeve 59 located between them. The lower bearing 58 is located approximately at the same level as the annular collar 40 and is thus above the plane of rotation of the cutters 42 in operation. The upper bearing 57 is located approximately half way up the hub 38. The lower bearing 58 is supported on a circlip 60. The shaft portion 51 is thus supported in the bearing housing 56. The bearing housing 56 has a screwthread 61 near its lower end. The screwhead 61 co-operates with a screwthread on the inner surface of an opening 62 in a supporting element in the form of a continuous plate 63. The bearing housing 56 can thus be connected in a simple manner with the plate 63.

Figure 4:
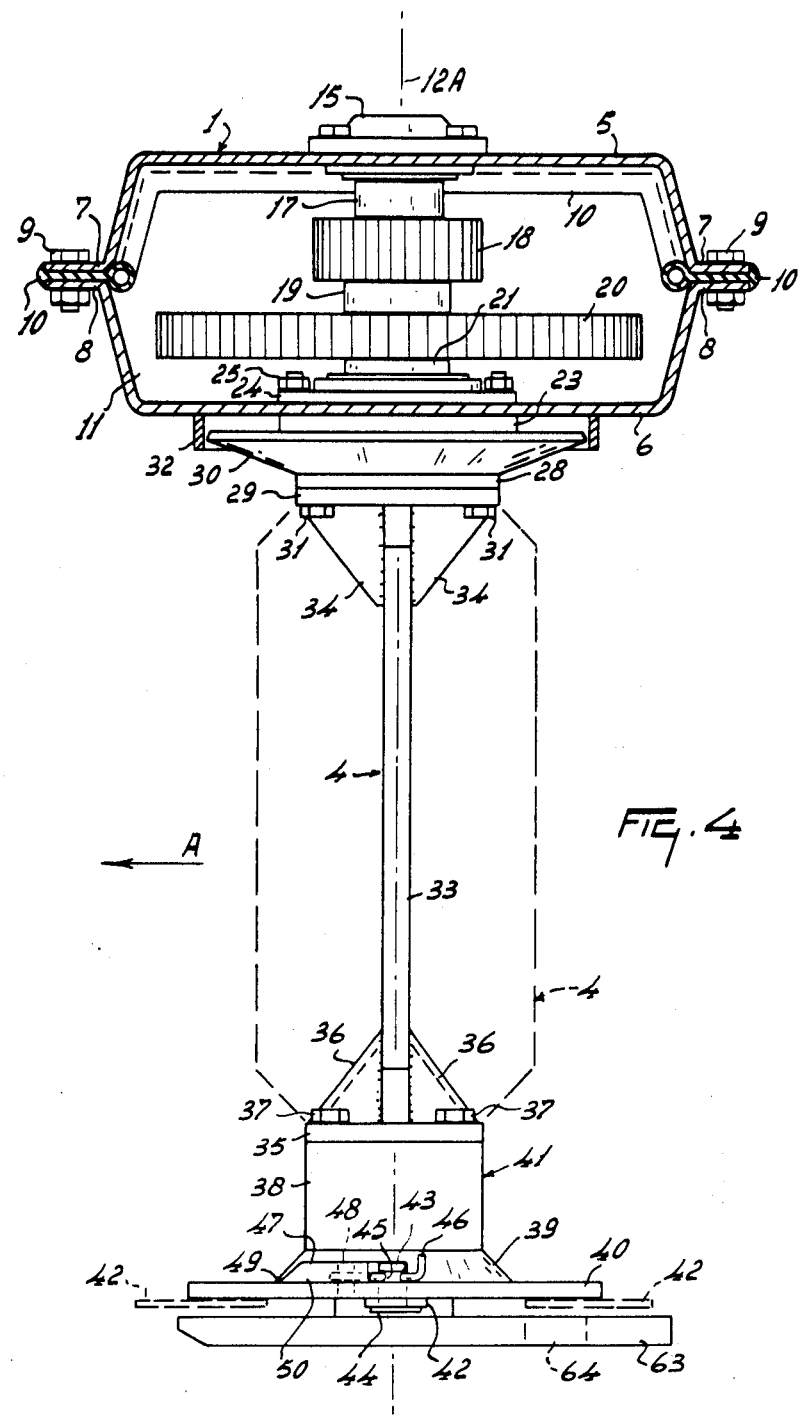
FIG. 4 is a sectional view on the lines IV—IV in FIG. 3.

As seen in the elevational view of FIG. 3, the cutters 42 are disposed between the annular collar 40 and the plate 63. The plate 63, which serves to support the cutting members on the ground and which has a thickness of preferably about one centimeter, extends parallel to the supporting beam 1 and is flat, having an upwardly inclined front edge portion (FIG. 4). Viewed on plan, the leading edge of the plate 63 has a scalloped, with arcuate portions disposed forwardly of the line on which the axes 12A lie. The trailing edge of the plate 63 extends beyond the paths described by the ends of the cutters 42 and is straight. Viewed on plan, each cutting element 41 is located completely within the periphery of the plate 63. Beneath each cutting element 41 the plate 63 has a circular opening 64 (FIG. 4). With respect to the direction of travel A, the opening 64 is located behind the rotary axis 12A (FIG. 5). The diameter of the opening exceeds the diameter of the shoulder 44. Thus each pin 43 can be removed by passing it downwardly through the opening 64.

Figure 5:
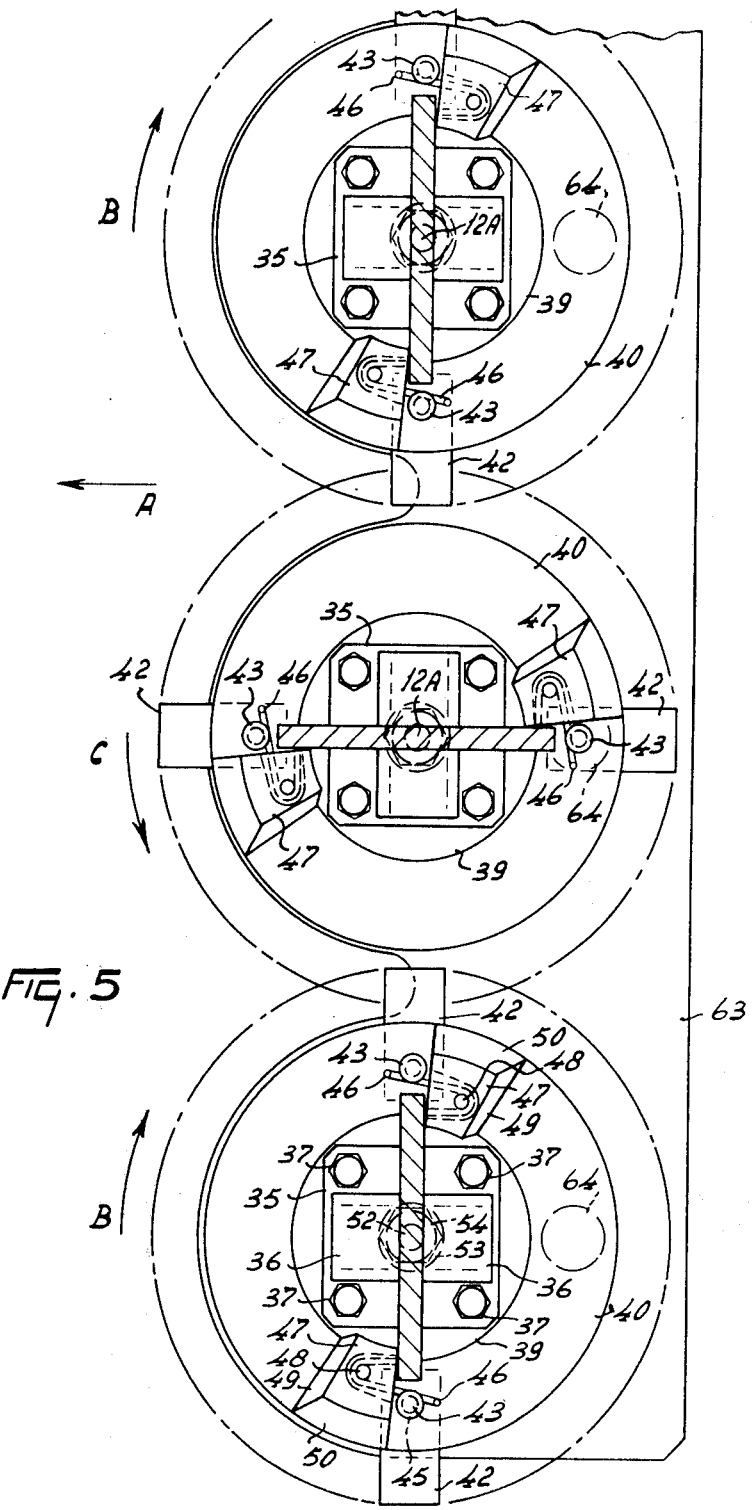
FIG. 5 is a sectional view on an enlarged scale taken on the line V—V in FIG. 1.

The meshing spur gears 20 ensure that each two adjacent cutting members 4 are driven in opposite senses B and C (FIG. 5). Each two adjacent plates 33 are disposed so that they lie in planes which are perpendicular to each other. The cutting elements 41 are located at the same level above the plate 63, and their paths overlap one another over a section beginning at a distance in front of the line connecting the axes 12A. Each cutting element is located at a distance of at least forty centimeters, preferably about forty-three centimeters, beneath the supporting beam 1. The distance between each two adjacent shafts 12, which is less than thirty centimeters, and preferably is about twenty-five centimeters, is, therefore, appreciably smaller than the distance between each cutting element and the supporting beam 1, the ratio between these distances being preferably about 5:9.

The pinion 18, which has a small diameter as compared with the pinions 20, is driven by a pinion 66, the diameter of which is equal to that of a pinion 20 and which is fastened to a shaft 65 (FIG. 3). The way in which the shaft 65 is supported is generally similar to that of the shaft portion 12. A spacer sleeve 67 is arranged between the pinion 66 and the lower bearing 14. The bearing 14 is surrounded by a bearing housing 68 extending well below the supporting beam 1, packings 69 and 70 ensuring a satisfactory seal against the supporting beam 1. The bearing housing 68 constitutes a gear box housing a bevel pinion 71 secured to the shaft 65. This bevel pinion 71 co-operates with a pinion 72 fixed by means of a key 73 on a solid shaft 74. The shaft 74 extends approximately horizontally in the direction of travel A, as shown in the elevational view of FIGS. 1 and 2, and is provided on the rear side of the beam 1 with one or more pulleys 75, there being three in the illustrated embodiment. These pulleys 75 are driven in a manner already described by means of the three V-belts 3A from the power take-off shaft of the tractor. The bearing housing 68 has two supporting parts 76 which are perpendicular to the beam 1 and provide additional stiffening of the driving structure. The center line of the shaft 74 coincides with the pivotal axis 2 of the supporting beam 1. Viewed on plan (FIG. 2) two swath boards 77 may be arranged whereby they are mounted from plate 63 behind the supporting beam 1, these boards converging rearwardly relative to the direction of movement A.

For operation, the mowing machine is attached to the three-point lifting device of the tractor and is driven from the power take-off shaft of the tractor via the belt transmission 3A, the shaft 74, the gear wheels 72 and 71, the gears 66 and 18 and the gear wheels 20 located above the cutting members 4. In this manner the cutting members can attain a very high speed, whereas nevertheless a very light drive is ensured. The speed is preferably 4000 rev/min or more and in a preferred embodiment the speed is 6000 to 8000 rev/min. The bearings of the shafts 12 at the top and bottom of the supporting beam 1 help to provide a vibration-free support of the cutting members 4.

The cutting members 4 are arranged at a fairly small distance from one another as compared with the fairly large distance between each cutter supporting 41 and the supporting beam 1. The co-operating cutter support means 41 can effectively deposit fairly narrow swaths, which can be satisfactorily tedded during subsequent treatment. Cutter support means 41, therefore, have a comparatively small diameter of preferably about twenty-five centimeters and above the cutting members there is a comparatively high delivery capacity for the cut crop. Owing to the specific design of the upright plate 33, the cutting elements 41 can mow long-stalk crop effectively and conduct it away rearwardly. Since adjacent plates 33 are perpendicular to one another, winding of crop arond the plates 33 is avoided. The downwardly inclined bottom end of each plate 33 prevents undesirable damage of crop and provided, in addition, a satisfactory connection between cutter support means 41 and the plate 33 above it. By its specific shape the plate 33 produces, in operation, an air stream which contributes to the conveyance of the crop. In an advantageous embodiment the width of each plate 33 is at least ten times and preferably fourteen times the thickness of the material. The construction of cutter support means 41 is specially designed to match the plate 63 below it. The annular collar 40 located directly above the plate 63 and having the cutters 42 arranged beneath it provides a disposition in which the cutters can perform their cutting operation throughout their operative length at a small, advantageous height above the ground surface. By fastening the cutters with the pins 43, the cutters can be replaced in a simple manner. After an inward turn of the spring 46 the pin 43 is passed downwards through the opening 64 in the plate 63, after which the cutter can be replaced. The position of the collar 40 at a very small distance above the ground means that the top surface of the annular collar 40 will effectively receive the mown crop and conduct it away rearwardly, viewed in the direction of travel A. The guide plates 47 constitute not only protective members for the pivotal shafts 43 but also constitute upward guides for the crop towards the plate 33. The plates 47 also act as screens and supports for the springs 46.

The continuous plate 63 provides an effective support for all the cutting members 4. Also, since adjacent plates 33 are perpendicular to one another, cutter support means 41 can be arranged at a comparatively large distance beneath the supporting beam 1, at at the same time a satisfactory rigidity of the construction is maintained. This construction permits of obtaining a large working width and a low weight for the machine. Owing to the comparatively light weight the mowing machine exerts little pressure on the ground so that even under wet weather conditions puddling of the ground, which might retard the growth of new plants, may be avoided. The mounting of the hub 38 on the shaft 51 journalled in the spaced bearings 57 and 58 provides at the bottom of the cutting member a vibration-free support on the plate 63. Moreover, the bearing housing can be simply and rapidly removed by the threaded joint in the opening 62.

Figure 6:
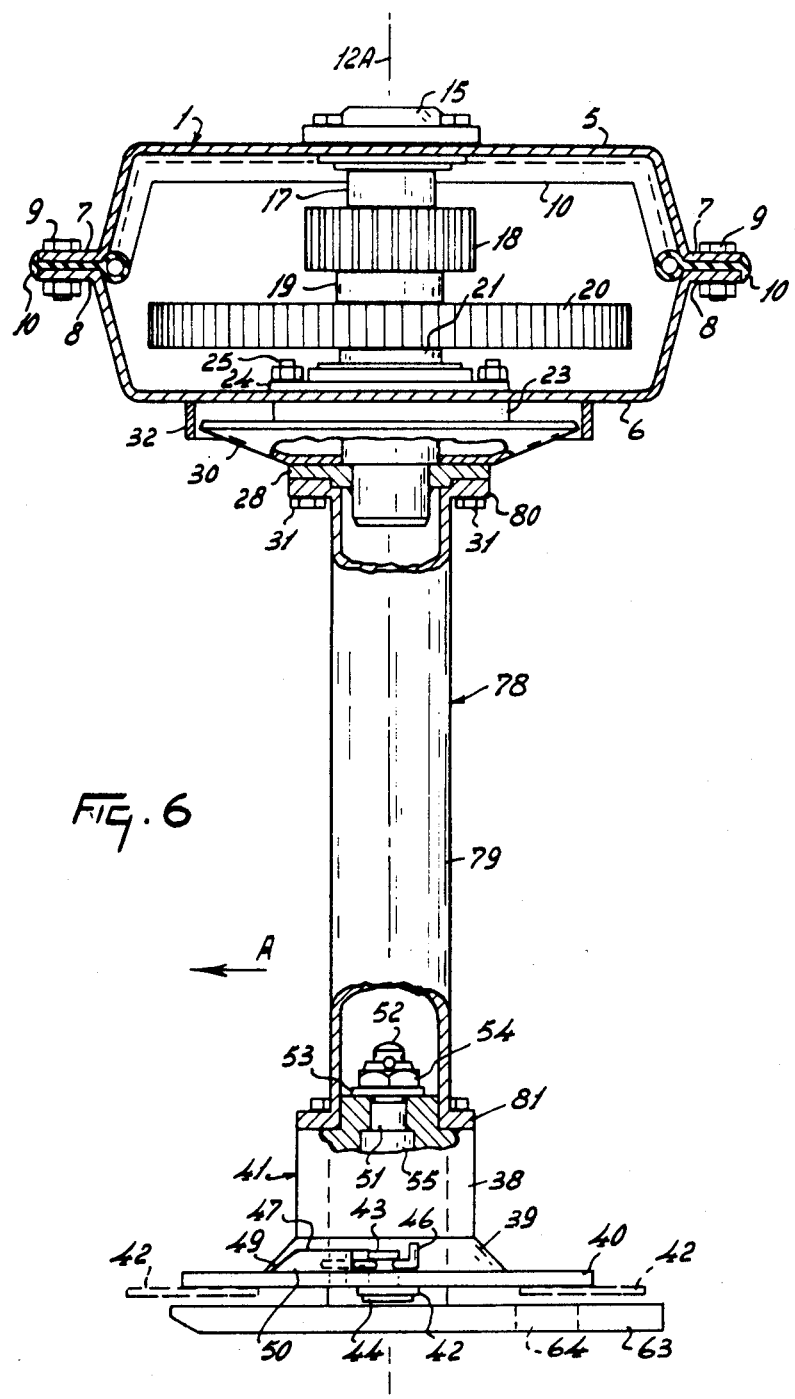
FIG. 6 illustrates an alternative embodiment of the part of the mowing machine shown in FIG. 4.

The structural embodiment shown in FIG. 6 largely corresponds with the construction of the mowing machine in the first embodiment. A cutting assembly 78 comprises a connecting member formed in this case by a tube 79 the center line of which coincides with the rotary axis 12A. The tube 79 is connected by a flange 80 at the top with the driving gear and by a flange 81 at the bottom with cutter supporting means 41. The construction shown in FIG. 6 may be advantageously employed when a high conveying capacity of the cutting member is desired, for example, when mowing light, short-stalk crop. The tube 79 permits a large distance between the cutter supporting means and the supporting beam 1, whereas the weight of the cutting member 78 may be comparatively low. Since the tube is releasable, it may be replaced to suit the conditions of the crop, for example, it may be replaced by the member 33.

FIG. 7 shows a further embodiment in which, if desired, the plate 63, which may be made from hardened material, may be locally supported additionally by means of a spherical supporting member 82. The supporting member 82 comprises at its center a cavity 83 in which the head of an axially extending bolt 84 can be countersunk. The bolt 84 acts as a fastening member for the supporting member 82 and can be screwed into an opening 85 in the bearing housing 68. The supporting member 82 is thus arranged preferably coaxially with the rotary axis 12A. The supporting member 82 has a diameter equal to preferably about half the diameter of the cutting element 41. Near its circumference the supporting member 82 has an upright rim 86, which can be partly introduced into an annular slot in the plate 63. The provision of the supporting member 82, which supports the plate 63 only locally, means that the plate 63 can be disposed sloping forwards, while its supporting effect is maintained and the downwardly inclined front side of the plate 63 remains in contact with the ground surface. The mowing machine can be adjusted by the supporting member 82. By selecting the axial dimension of the supporting member 82 the cutting height may be varied at will. The supporting member 82, in addition, protects the plate 63 against wear. Therefore, the supporting member 82 will be employed under conditions under which comparatively heavy wear of the plate 63 may otherwise be expected, for example, on rocky fields.

Although various features of the mowing machine that have been described, and that are illustrated in the drawings, are be set forth in the following claims as inventive features, it is to be understood that the invention is not necessarily limited to these features and that it encompasses all of the features that have been described both individually and in various combinations.

What I claim as new and desire to secure by Letters Patent of the United States is:

1. A mowing machine comprising at least two cutting members, bearing housings therefor, and bearings in said housings, drive means and a supporting element, said cutting members each being mounted on a respective said bearing housing for rotation about substantially vertical axes and rotated by drive means disposed above said cutting members, a frame beam disposed above said cutting members, a frame beam disposed above said cutting members, each said cutting member being supported at its lower region by said supporting element, said frame beam and said supporting element be connected only through said cutting members, said bearing housings each accommodating at least two said bearings for supporting the respective said cutting member, said bearing housings being mounted on said supporting element, each said cutter member including an annular collar surrounding said bearings at generally the same level as one of said bearings, a cutter and a pin for for supporting said cutter, in which said supporting element has an opening beneath each said cutting member in which said cutter is pivotally connected to each said cutting member by said pin provided therefor which can be passed downwardly through the corresponding said opening, a spring element locking said pin in place on said annular collar.

2. A mowing machine as claimed in claim 1, in which a hub is provided for each said cutting member and one of said bearings is disposed approximately one-half of the way up said hub.

3. A mowing machine as claimed in claim 1, in which a part-spherical supporting member is connected to the lower aspect of said supporting element coaxially with the axis of rotation of at least one of said cutting members, said supporting member having a diameter equal to approximately one-half the diameter of the corresponding said cutting member.

4. A mowing machine as claimed in claim 3, in which each said pin is provided with a shoulder near its lower end for supporting the corresponding said cutter.

5. A mowing machine as claimed in claim 1, including an input drive shaft, and a horizontal pivotal shaft, in which said drive means are accommodated in said frame beam, said frame beam comprising a gear casing, said gear casing being provided near an end portion thereof with said input drive shaft which is coaxial with said pivotal horizontal shaft for said gear casing, said pivotal horizontal shaft extending approximately in the intended direction of operative travel of the mowing machine, said gear casing being pivotable about said pivotal horizontal shaft.

6. A mowing machine as claimed in claim 5, in which a belt transmission is connected with said input shaft and is adapted for transmitting a driving force from a power take-off shaft to drive means of the mowing machine.

7. A mowing machine as claimed in claim 6, in which said drive means is adapted to rotate said cutting members at four thousand rpm or more.

8. A mowing machine comprising at least two cutting members, bearing housings therefor, and bearings in said housings, drive means and a supporting element, said cutting members each being mounted on a respective said bearing housing for rotation about substantially vertical axes and rotated by drive means disposed above said cutting members, each said cutting member being supported at its lower region by said supporting element, said bearing housings each accommodating at least two said bearings for supporting the respective said cutting member, said bearing housings being mounted on said supporting element, each said cutter member including an annular collar surrounding said bearings at generally the same level as one of said bearings, a cutter and a pin for supporting said cutter included in each said cutter member, an opening beneath each said cutting member in said supporting element, each said cutter being pivotably connected in each said respective cutting member by said pin, said pin being adapted to be passed downwardly through the corresponding opening in said supporting element, each said pin being provided with a shoulder near its lower end for supporting its corresponding said cutter, a spring element in each said cutting member which locks said pin in place on said annular collar.

9. A mowing machine as claimed in claim 8, in which said spring element comprises a spring arm pressing said pin radially outwardly with respect to the axis of rotation of the corresponding said cutting member.

10. A mowing machine as claimed in claim 9, including a guide plate on said annular collar, in which said pin has an annular groove for accommodating said spring arm and in which the portion of said spring element remote from said pin is located inside said guide plate provided on said annular collar.

11. A mowing machine as claimed in claim 10, in which said guide plate surrounds at least partly a pivotal shaft associated therewith about which said spring element is turned.

12. A mowing machine as claimed in claim 11, in which said guide plate is located in front of said pin with respect to the direction of rotation of said cutting member.

13. A mowing machine as claimed in claim 12, in which said guide plate is secured to the upper side of said annular collar and in which said guide plate has a height above the top surface of said annular collar at least corresponding to the top part of said pin.

* * * * *